J. H. Shireman,
Harvester Cutter.

No. 25,679.  Patented Oct. 4, 1859.

R. W. Fenwick  J. H. Shireman
L. Coles Atty.

UNITED STATES PATENT OFFICE.

J. H. SHIREMAN, OF EAST BERLIN, PENNSYLVANIA.

IMPROVEMENT IN DIVIDERS FOR HARVESTERS.

Specification forming part of Letters Patent No. 25,679, dated October 4, 1859.

*To all whom it may concern:*

Be it known that I, J. H. SHIREMAN, of East Berlin, in the county of Adams and State of Pennsylvania, have invented a new and useful Improvement in Dividers for Harvesters; and I do hereby declare that the following is a full, clear, and exact description of the same, reference being had to the accompanying drawings, forming a part of this specification, in which—

Figure 1:
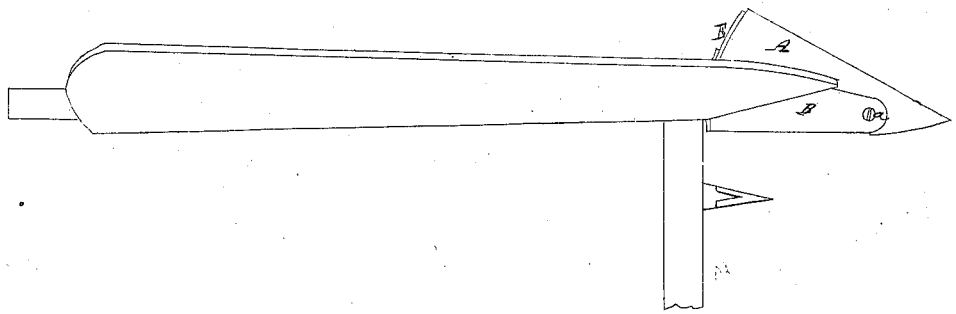
Figure 2:
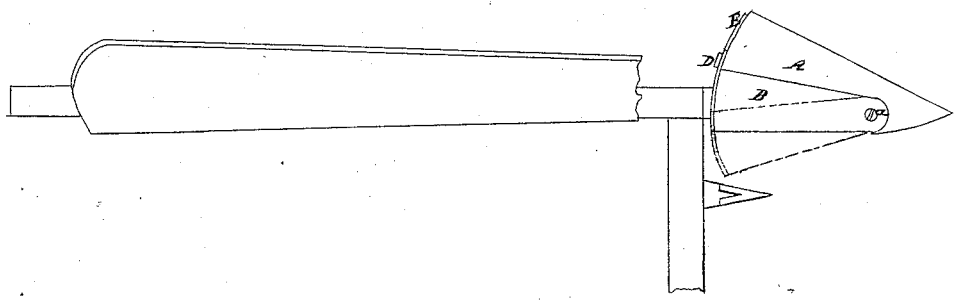

Figure 1 represents a plan view of my divider applied to a harvester. Fig. 2 is a similar view, the divider being shown expanded transversely to its full extent, and Fig. 3 a rear view of the same.

Similar letters of reference in each of the several figures indicate corresponding parts.

My invention relates to an improvement in the construction and arrangement of the horizontal wedge-formed divider for harvesters; and it consists in providing certain means for the convenient adjustment of its width, whereby it may be adapted to use in harvesting various kinds of grain or grass, as will be here inafter more fully described.

To enable others skilled in the art to make and use my invention, I will proceed to describe its construction and operation.

The part A of the divider is made of scantling or thick plank in the form represented in the drawings, the front end coming to a point and the back end terminating in an arc, and permanently attached to the frame.

Figure 3:
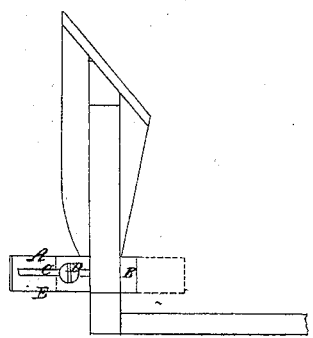

To the top of the divider is attached a thin plate of iron, B, covering nearly or quite one-half of the top in width and coming within a few inches of the point of the divider. This plate is of sufficient width to be bent down so as to cover that edge of the divider next the sickle. The vertical portion of this iron plate or case must be long enough to bend around in the arc of a circle and cover the curved end of the part A of the divider. The curved part E of the iron plate or case has an oblong slot, C, cut in it, as represented in Fig. 3, in which is placed a set-screw, D, said slot and screw answering for holding the iron in its proper place and allowing for any desirable adjustment. The front part of this iron plate or case, on the top, is pivoted to the wood by a bolt or pin, *a*, on which it turns.

From the above description of the parts it will be seen that by loosening the screw D the part B of the divider can be adjusted so as to stand more or less obliquely to the cutter-bar, as illustrated in red color in Figs. 2 and 3. By thus adjusting the part B of the divider the machine may be readily adapted to cutting either light or heavy crops of grain, grass, or clover without conducting too much upon the cutter at that side of the machine.

It will also be seen that if the part B of the divider is moved outward, as shown in Fig. 1, so as to stand at right angles to the cutter, in cutting short grass, clover, &c., the grass or other substance will be divided without having its direction changed in passing onto the platform, and thus the tendency which the oblique adjustment would give it to turn inward is avoided, and the liability of the short grass to fall onto the cutter and clog its movement overcome.

What I claim as my invention, and desire to secure by Letters Patent, is—

The combination of the adjustable case B with the stationary horizontal dividing-point A, the parts being constructed and arranged in the manner and for the purpose described.

The above specification of my improvement in reaping-machines signed by me this 2d day of August, 1859.

J. H. SHIREMAN.

Witnesses:
G. YORKE ATLEE,
G. B. HASLESTON,
JOHN S. HOLLINGSHEAD.